United States Patent
Hals

(10) Patent No.: US 6,270,065 B1
(45) Date of Patent: Aug. 7, 2001

(54) SEAT SUSPENSION ASSEMBLY FOR A TWO-WHEELER

(75) Inventor: Cato Hals, Oslo (NO)

(73) Assignee: Cato Hals Design AS, Oslo (NO)

( * ) Notice: Subject to any disclaimer, the term of this patent is extended or adjusted under 35 U.S.C. 154(b) by 0 days.

(21) Appl. No.: 09/177,083

(22) Filed: Oct. 23, 1998

(51) Int. Cl.$^7$ ....................................... B62J 1/02
(52) U.S. Cl. .................. 267/132; 297/195.1; 280/283
(58) Field of Search .................. 267/132; 297/195.1; 248/564, 200, 300; 280/283

(56) References Cited

U.S. PATENT DOCUMENTS

| | | | |
|---|---|---|---|
| 593,631 | * 11/1897 | Wood | 267/132 |
| 4,103,858 | * 8/1978 | Swenson | 248/399 |
| 5,489,139 | * 2/1996 | McFarland | 297/195.1 |
| 5,702,093 | * 12/1997 | Liao | 267/132 |

FOREIGN PATENT DOCUMENTS

| | | |
|---|---|---|
| 300168 | 4/1997 | (NO) . |
| 96/38335 | 12/1996 | (WO) . |

* cited by examiner

Primary Examiner—Robert J. Oberleitner
Assistant Examiner—Pamela J. Rodriguez
(74) Attorney, Agent, or Firm—Wenderoth, Lind & Ponack, LLP

(57) ABSTRACT

A seat suspension assembly for a bicycle has a movable and cushioning intermediate section between a lower seat post part and an upper seat attachment part. The intermediate section comprises parallel bars journalled to a head on top of the seat post, and to the seat attachment part. A springing mechanism is equipped with a system for adjusting the effective spring rate of the springing mechanism.

15 Claims, 4 Drawing Sheets

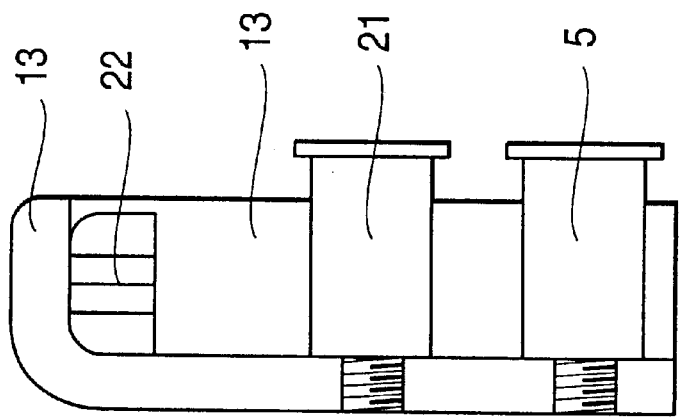
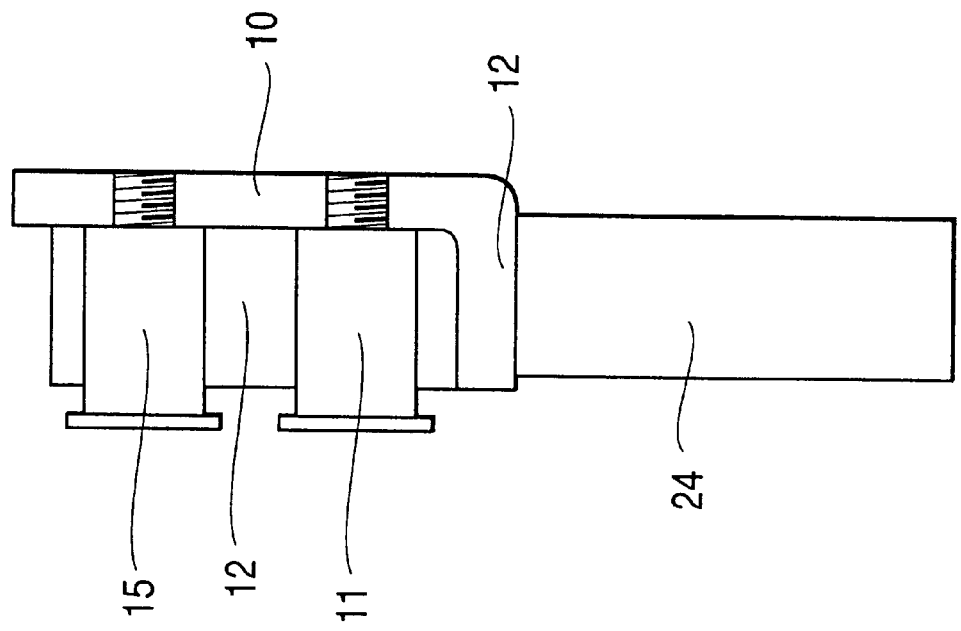

SEAT SUSPENSION ASSEMBLY FOR A TWO-WHEELER

BACKGROUND OF THE INVENTION

1. Field of the Invention

The present invention relates to a suspension system in connection with a saddle on a two-wheeled vehicle, preferably a bicycle. More precisely the invention concerns a seat suspension assembly to be mounted, e.g. on a standard bicycle, at the place on a bicycle frame where a normal seat post is inserted into a seat tube. A standard type saddle shall then be mounted on top of the seat suspension assembly.

2. Description of the Related Art

There are several types of previously known suspensions in connection with bicycle and motorcycle saddles.

Among the more recent types of suspensions for bicycle seats, is one in which the seat has a spring action in a direction along the seat tube in a telescopic assembly, which in most bicycles is slanted down toward the crank bearing. This type of suspension has a clear limitation in that the travel of the assembly along the seat tube during a spring action is in a direction that can deviate from the desired direction by as much as 45°. This is so because, the upward movement a saddle makes during a blow that pushes the rear wheel upward is obliquely forward/upward, and not obliquely downward/forward in the direction of the seat tube. The above mentioned suspension also exhibits limitations with respect to travel. This is so because, the movement in the wrong direction will become more noticeable the longer the travel is, and will be quite perceptible when the bumps encountered are larger than a certain size, typically 10–15 mm.

A springy seat device for a two-wheeler, in particular a bicycle or a mountain bike, is previously known from Norwegian patent no. 300.168. The seat suspension assembly disclosed in NO 300.168 is based on a parallelogram solution that provides the correct type of travel during suspension movement, but the built-in spring thereof is mounted between two diagonally situated bearings in the parallelogram construction. Because of this, the seat suspension assembly has the limitation that in order to adapt the seat suspension assembly to the weight of the bicyclist, the spring must be replaced by another spring that is more or less compliant. In order to do this, the complete assembly must be disassembled, a new spring must be inserted, and thereafter the assembly must be reassembled.

It is important to provide an easy option for adapting the suspension to variable conditions, such as actual weight on the saddle. During slow bicycling, where the bicyclist will often sit in a rather erect position, more weight will be transferred to the saddle, than in the case when the bicycling is rapid and the bicyclist leans more forward over the handlebars. In this latter case, a larger portion of the weight is shifted forward and away from the saddle, and in these two situations, more or less compliant springs in the assembly will be of use. A bicyclist may be interested in a more or less compliant suspension in relation to the track he/she is about to bicycle through. If the track is complicated, with low speed to match, a different seat compliance will be desirable than if the track on average allows for higher speeds.

Such matters can be compensated for somewhat through an adjusted spring bias, but such a bias does not make the spring stiffer, i.e. the spring characteristic is not changed.

The suspension will easily become too stiff when using a strong spring, irrespective of how low a bias is chosen, and hence will work poorly on small bumps. Experience has also shown that it is difficult to find the correct spring compliance immediately, because the spring characteristic is as dependent on weight as on riding style. Changing the spring characteristic may become necessary during a development period of a bicyclist, e.g. during a weight reduction period. Consequently, it is impossible to state what is correct for the individual at any particular time. It is therefore desirable to be able to experiment on the spring rate of the seat suspension assembly.

BRIEF DESCRIPTION OF THE INVENTION

The present invention provides a seat suspension assembly with an option for adjusting the compliance of the spring system. Further, it is a goal of the invention to provide a light and sturdy construction that is easily mounted and disassembled, and which gives low bearing wear, thereby preventing creation of play in the assembly after a short time.

Therefore, in accordance with the invention, in a first aspect thereof There is provided a seat spring suspension assembly for a two-wheeled vehicle, preferably a bicycle, adapted to be mounted in a standard frame seat tube and to receive and retain a standard seat, wherein the assembly comprises:

- at a top portion thereof, a seat attachment part to which a seat can be attached;
- at a lowermost portion thereof a seat post part for conventional tightening inside the seat tube;
- between the seat attachment part and the seat post part, a movable intermediate section comprising two, three or four substantially parallel bars pointing obliquely upwards and backwards, and each being journalled at a forward end to respective bearings on a post head arranged on top of the seat post part, and journalled at the rear end to respective bearings on the seat attachment part; and
- a springing mechanism arranged substantially in the movable intermediate section to provide an upward directed springing force against the seat attachment part, wherein the springing mechanism is equipped with a system for adjusting the effective spring rate of the springing mechanism.

In a preferred embodiment of the invention, the springing mechanism comprises a linearly acting spring, wherein at least one end of the spring has an abutment that can be shifted transversely in relation to the linear direction of the spring.

In this preferred embodiment, the transversely shiftable abutment of the linearly acting spring is preferably arranged in a cartridge unit placed against the seat attachment part between the bars, and the other end of the spring is attached to a lower part of the post head, possibly in a lower one of the bearings on the post head.

The above mentioned cartridge unit may preferably be attached to a lower one of the bearings on the seat attachment part. In the preferred embodiment, a bias screw is preferably arranged for pre-tensioning of the spring, and a stopper part may then be provided to limit the upward deflection of the assembly caused by the biasing.

In an alternative embodiment of the invention, the springing mechanism comprises at least one torsion spring surrounding at least one of the bearings, with the torsion spring having arms of which one engages the seat attachment part or the post head, and another of which engages a shiftable projection on one of the bars.

In this alternative embodiment, the torsion spring has an adjustable effective spring rate and may be arranged around the lower bearing on the seat attachment part, while the shiftable projection may be placed on the inside/underside of the top bar.

In any of the above mentioned embodiments, the springing mechanism may comprise at least one further torsion spring arranged around one of the bearings, to provide an enhanced total spring rate.

In a second aspect of the invention a seat spring suspension assembly for a two-wheeled vehicle, preferably a bicycle, is provided, adapted to be mounted in a standard frame seat tube and to receive and retain a standard seat, the assembly comprising:

- at an uppermost portion thereof, a seat attachment part to which the seat can be attached;
- at a lowermost portion thereof, a seat post part for conventional tightening inside the seat tube;
- between the seat attachment part and the seat post, a movable intermediate section comprising two, three or four substantially parallel bars pointing obliquely upward and backward, and each being journalled at its forwarded end to respective bearings on a post head arranged on top of the seat post part, and at its rear end to respective bearings on the seat attachment part; and
- a springing mechanism arranged substantially in the movable intermediate section to provide an upward directed spring force against the seat attachment part, wherein the seat attachment part and the post head have, in relation to a center plane spanned by the normal seat pointing direction and the seat post center line, an asymmetrical and substantially cupulate shape with necks for the bars pointing substantially horizontally outward from the insides of the seat attachment part and the post head respectively.

In a favorable embodiment of the second aspect of the invention, the necks are attached to the post head and the seat attachment part, respectively, by screwing a threaded end part into threaded holes on the post head and the seat attachment part, respectively, and the necks have at their opposite end, an increased diameter, a flange or a stopper disk in order to hold the bars in place.

In a third and unifying aspect of the invention, There is provided a seat spring suspension assembly for a two-wheeled vehicle, preferably a bicycle, adapted to be mounted in a standard frame seat tube and to receive and retain a standard seat, the assembly comprising

- at an uppermost portion thereof, a seat attachment part to which the seat can be attached;
- at a lowermost portion thereof, a seat post part for conventional tightening inside the seat tube;
- between the seat attachment part and the seat post part, a movable intermediate section comprising two, three, or four substantially parallel bars pointing obliquely upward and backward, and each being journalled at its forward end to respective bearings on a post head arranged on top of the seat post part, and at its rear end to respective bearings on the seat attachment part; and
- a springing mechanism arranged substantially in the movable intermediate section to provide an upward directed spring force against the seat attachment part, wherein
- the springing mechanism is equipped with a system for adjusting the effective spring rate of the springing mechanism, and wherein
- the seat attachment part and the post head have, in relation to a center plane spanned by the normal seat pointing direction and the rear post center line, an asymmetrical and substantially cupulate shape with necks for the bars pointing substantially horizontally outward from the insides of the seat attachment part and the post head respectively.

BRIEF DESCRIPTION OF THE DRAWINGS

The invention shall now be illuminated further by means of a detailed description of examples of the embodiments of the invention, and accordingly, reference is made to the appended drawings, where FIG. 2 shows a lower seat post part in a sectional view from the rear, FIG. 3 shows a seat attachment part in a sectional view from the front.

DETAILED DESCRIPTION OF EMBODIMENTS OF THE INVENTION

The seat spring suspension assembly in accordance with the invention comprises three main sections: a lower seat post pail to provide attachment to the seat tube of the vehicle, wherein the seat post part has a seat post head on top; a movable intermediate section; and at the top thereof a seat attachment part to which a standard seat can be attached.

Figure 1:
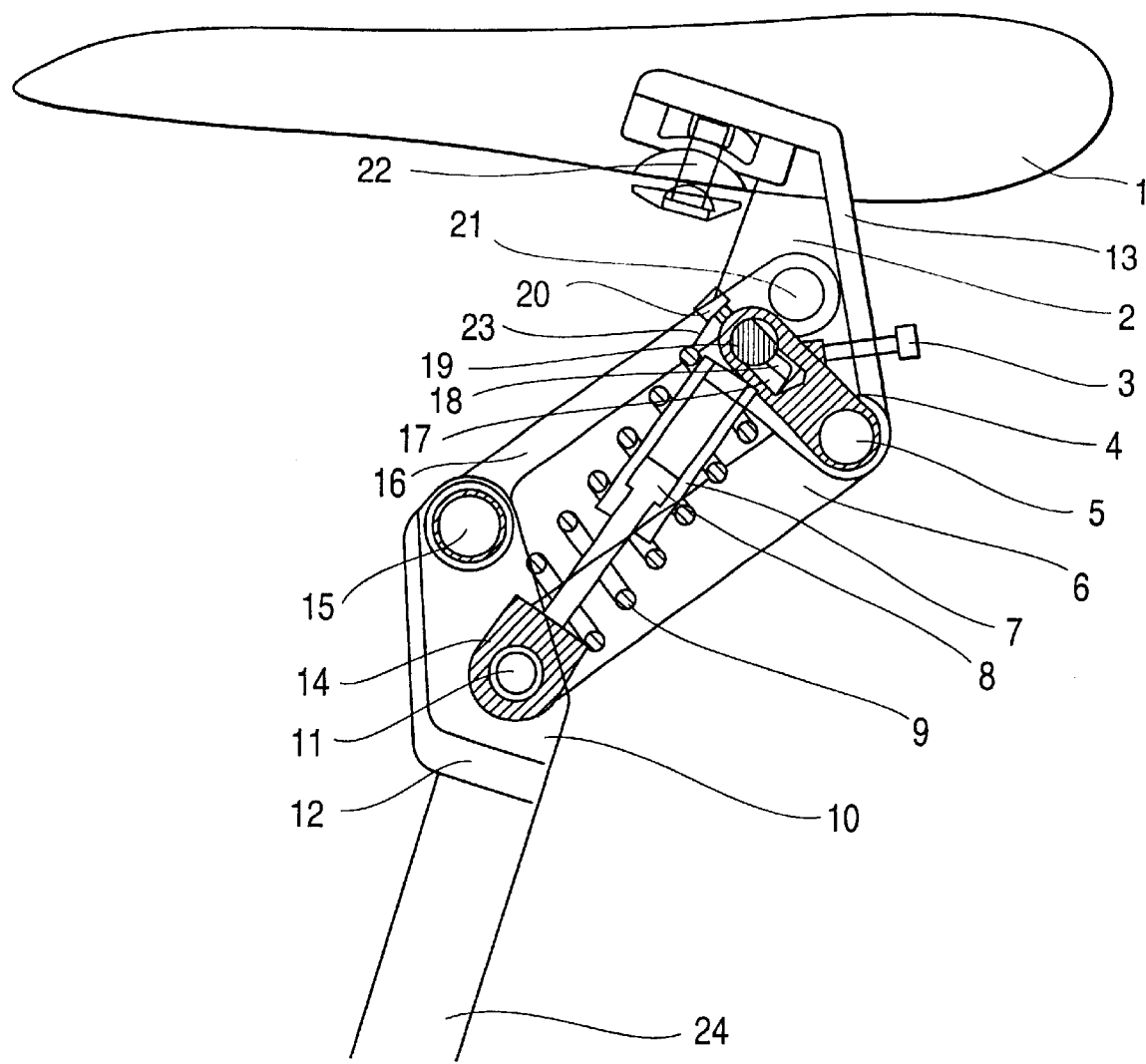
FIG. 1 shows a preferred embodiment of the invention in a sectional view of a complete seat suspension assembly.

A preferred embodiment of the invention is shown in FIG. 1. The seat post part 24 is adapted to be inserted and tightened in a standard seat tube as a replacement for another seat post, and a post head on top has reference numeral 10. The seat attachment part 2 is provided on top with attachment details 22 according to per se previously known principles, for attaching a standard bicycle seat 1. Between the post head 10 and the seat attachment part 2 There is a movable intermediate section constituted by substantially parallel bars and a springing mechanism that may include a damper device. The upper one of the parallel bars 16 is attached at respective ends thereof to upper bearing necks 15, 21 on the post head 10 and the seat attachment part 2, respectively. The lower one of the bars 6 is attached at each end thereof to lower bearing necks 11, 5 on the post head 10 and the seat attachment part 2, respectively. Thus, the substantially parallel bars 6, 16 can pivot around all bearing necks 11, 15, 5, 21, and if the center distance between bearing necks along each of the bars 6, 16 are equal, and additionally if the distance between the center points of the bearing necks on the post head 10 is equal to the distance between the center points of the bearing necks on the seat attachment part 2, movement of the movable intermediate section will be a "parallelogram movement", i.e. the seat 1 will stay in a horizontal position during the cushioning movement, if the seat was in a horizontal position from the start.

It is also possible to make the distance between the center points unequal to one another. This may then cause the tip of the seat to tilt a little up or down during the cushioning movement, depending in what is desirable.

Moreover, in the preferred embodiment two bars 6,16 are shown, i.e. one bar on top and one bar thereunder, but it is possible to design this construction in such a manner that each bar is formed from two split bars next to each other. Such embodiment will provide more space for moving possible details out and in between the split bars, but may at the same time constitute a somewhat weaker construction.

In an important aspect of the invention, the bars 6, 16 are mounted to a seat post head 10 and a seat attachment part 2, which are asymmetrically and cupulately shaped, such as appears from FIGS. 2 and 3, which figures show respectively a preferred embodiment of a post head 10 and a seat attachment part 2. The asymmetry in question is an asymmetry about an imagined vertical principal plane of the bicycle frame itself, i.e. a plane to be envisaged spanned by the normal pointing direction of the seat and the center line of the seat post. The post head 10, seen directly in a rear view in FIG. 2, is a semi-cupulate construction where the cup bottom extends vertically and constitutes an attachment part for the two bearing necks 15 and 11, that are screwed into threaded holes in the vertical cup bottom. At the same time the two bars 6 and 16 are attached to the post head 10. The edges of the cup are shown by reference numeral 12.

Correspondingly, the seat attachment part 2 has a semi-cupulate shape, with the cup bottom lying beside the above mentioned center plane in the same manner as the cup bottom of the post head. As appears from FIG. 3, which figure shows the seat attachment part 2 in a direct front view, the cup bottom extends vertically, while the cup edges 13 are bent out on top and behind the bearing necks 5 and 21, that are screwed into the threaded holes into the vertical cup bottom. When the necks 5 and 21 are affixed by screwing, the bars 6 and 16 are attached to the seat attachment part 2 at the same time.

In addition, FIGS. 2 and 3 show that each of the bearing necks preferably have an enlargement, a flange or a disk at is outermost end to hold the bars 6, 16 in place.

When using the preferred asymmetrical embodiment of the invention, the mounting operation may take place in a simple manner, since several parts in quite a simple manner can be slid onto the bearing necks which are then fastened by screwing. Due to the cupulate and asymmetric shape, There is also achieved a gain of space with the effect that the bearing necks can be designed with a large diameter. Consequently, large bearing surfaces are obtained, which feature makes the bearings resistant to the development of play.

Referring once again to FIG. 1, in the following the most important aspect of the present invention will be discussed, namely a springing mechanism which comprises a system for adjusting the effective spring rate of the springing mechanism. This is something quite different from a biasing means, that only makes a spring work in a range outside the relaxed spring position.

In FIG. 1 a spring 9 is mounted so as to engage an engagement part 14 which, in the shown example, is mounted on bearing neck 11. This lower engagement for spring 9 might equally well be placed on a separate stud a little further down and in on the post head 10, i.e. separated from the bearing neck 11.

Considering for a moment the solution stated in Norwegian patent no. 300.168, one finds that the spring in that publication engages in its upper end the top rear bearing neck (like bearing neck 21 in this specification). The actual cushioning is then achieved by compressing the spring mechanism so that the spring provides a counter-force as the intermediate section moves when a bump hits the rear wheel and rotates the bicycle frame upward and forward about the front wheel axis, without transferring this energy and movement to the seat, which energy and movement are instead absorbed by the spring and neutralized due to the general geometry of the assembly. In the embodiment of the present invention that is shown in FIG. 1, spring 9 extends substantially diagonally up in a direction toward bearing neck 21 on the seat attachment part, but does not land thereon. On the contrary, the spring 9 lands on an upper abutment part 23 which is attached to a laterally movable bolt 19 held in a cartridge unit 4, which is supported at a lower end on bearing neck 5, and which leans against the rear "cup edge" 13 of the seat attachment part 2 via a bias screw 3.

If bias screw 3 is in a fully retracted position, the cartridge unit 4 will contact the "cup edge" 13, pivoted around bearing neck 5.

Turning adjustment screw 20 will make bolt 19 travel on threaded part 18 of the screw 20 while the screw 20 rotates without translatory movement. Accordingly, the end of the spring will move, i.e. spring 9 will rotate about its lower engagement point, in this case bearing neck 11.

When the spring 9 has been rotated such as mentioned above, one has in reality adjusted the effective spring rate of the springing means. This is realized through the following consideration:

If slot 17 in the cartridge unit 4 were so long that the upper spring abutment (or bolt 19) were moved all the way down to bearing neck 5, then a downward movement of the complete assembly would not have caused any change in length of spring 9, i.e. the spring would not have been part of any cushioning action at all. On the other hand, in the position of spring 9 in FIG. 1, a downward deflection of the assembly will result in a certain compression of the spring, say a compression amounting to A mm.

This adjustable compression of the spring for one and the same downward assembly deflection, e.g. for a full assembly deflection from A mm to (theoretically) 0 mm, at a (theoretical) displacement from a diagonally directed position to a position along the lower bar, means that the spring rate is adjusted from a certain somewhat high adjusted value to 0 (in the theoretical case).

In the real case, the slot 17 and the screw 20 are designed with lengths to provide a spring rate variation rate that is adapted to normal bicyclist body weight ranges. This may include body weight ranges like 30–60 kg, 50–85 kg or 70–120 kg.

Thus, when a bicyclist has the opportunity to adjust the effective spring rate in a simple manner, such as by turning screw 20 according to a body weight, There will of course also exist an opportunity to adjust the spring rate further according to individual taste, and also according to type of terrain, riding style and skills.

It is also possible to provide a bias by means of the above mentioned bias screw 3 which can be screwed into a threaded hole in the "cup edge" 13 to force the cartridge unit 4 to pivot about bearing neck 5 and to compress spring 9.

As previously mentioned, it is also possible to place the forward lower support point for spring 9 outside of bearing neck 11, since the invention does not depend on such a location. Then one may provide an extra flange on post head 10 for attaching a separate through bolt to provide engagement for spring 9. Thereby, a longer spring 9 is also made possible, with correspondingly longer travel path for the spring and improved adjustment opportunities.

Other variants should also be mentioned;

One many include in the springing mechanism a damper device, however, this is not essential for the invention. In FIG. 1 is shown a telescopic damper 7, 8 mounted coaxially inside the linear helical spring 9. A damper such as shown here, will also act as a stopper to prevent an excessive upward movement, i.e. part 8 will contact a rear abutment edge in part 7 and stop the assembly from swinging further upwards.

It is further possible to use an "opposite" springing arrangement, i.e. using a spring intended for tensile load, mounted substantially along the other possible diagonal in the intermediate section, i.e. from a position near bearing neck 15 and in a direction toward bearing neck 5.

The spring 9 may be of a type that has a progressive action.

Figure 4A:
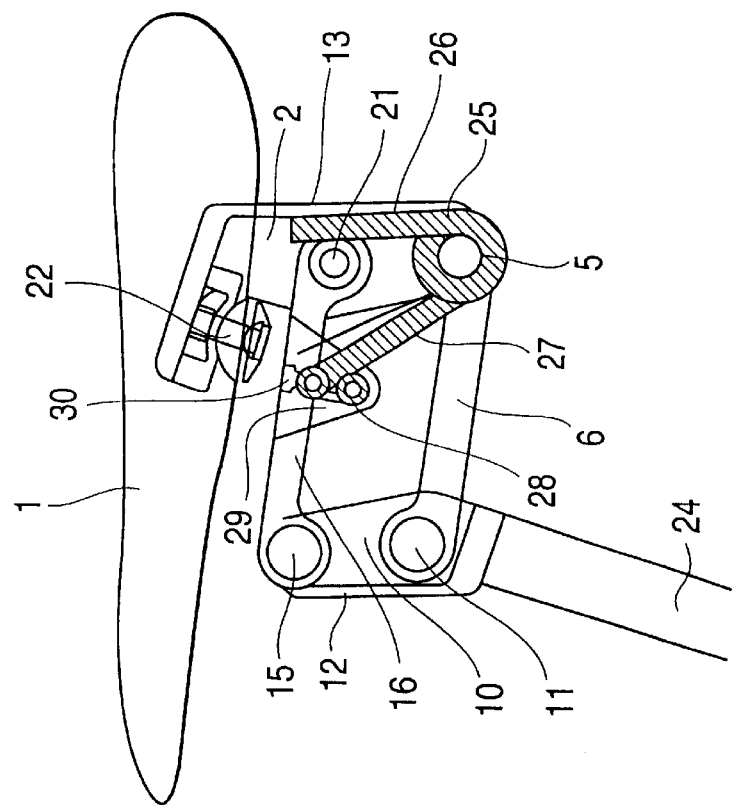
FIG. 4(a) shows an alternative embodiment of a seat suspension assembly in accordance with the invention in a relaxed state.
Figure 4B:
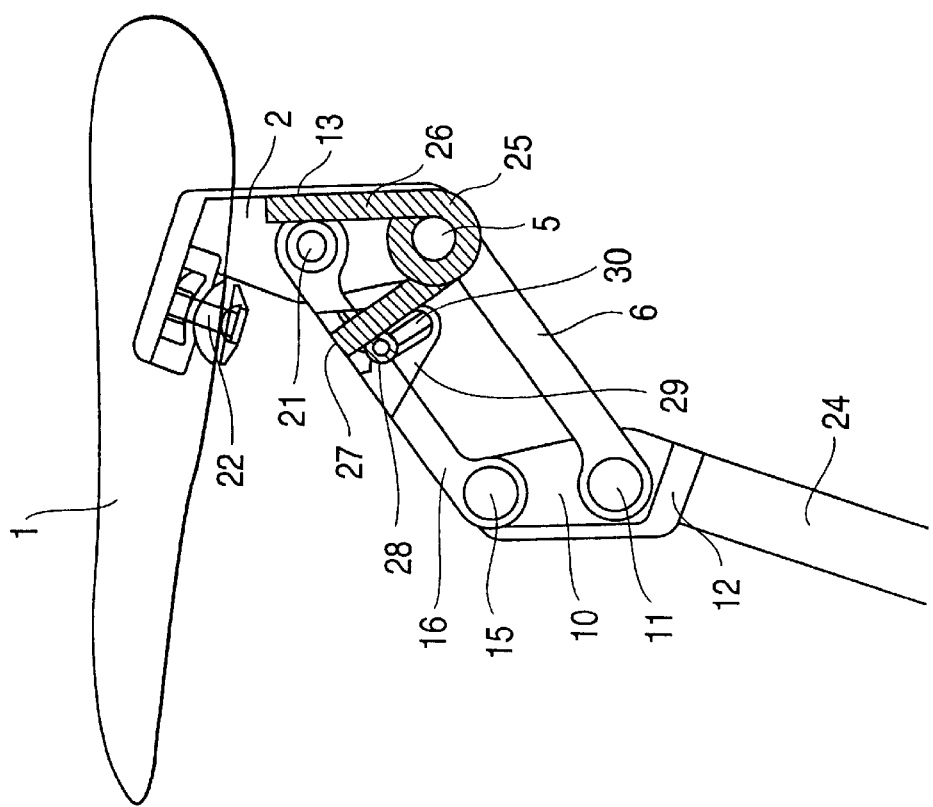
FIG. 4(b) shows the alternative embodiment of FIG. 4(a) in a stressed state.

In FIG. 4a and FIG. 4b is shown an alternative embodiment of the most important aspect of the invention, in the form of a suspension assembly having the same general geometry and spring characteristics as previously mentioned, but with another type of springing mechanism, which also comprises a system for adjusting the effective spring rate of the springing mechanism, similar to that of the embodiment of FIG. 1. The reference numerals of FIG. 4a and FIG. 4b correspond generally to the same detail having the same numeral as in other figures.

The embodiment of FIG. 4a and FIG. 4b is based on the use of torsion springs, i.e. only one torsion spring 25 is used in the shown example. Spring 25 is positioned around the lower rear bearing neck 5, has a rear arm 26 engaging the "cup edge" 13 on seat attachment part 2, and also has a forward arm 27. FIG. 4a shows the assembly in a relaxed or an upper, non-cushioned state. The forward arm 27 engages a bolt 28 arranged in a projection 29 on the top bar 16.

The torsion spring 25 provides a force to drive the seat attachment part 2 upwards. It appears from FIG. 4b that in a downward compressed state, the arms 26 and 27 of the torsion spring will be pinched toward each other, and they will then yield a force to straighten out, so that the spring will provide a spring force in an upward direction.

In FIG. 4b the bolt 28 lies in the same position in the projection 29 as in FIG. 4a. The forward spring arm 27 points such as shown without hatching, and the spring is then maximally pinched together. (NB: The forward spring arm 27 is shown in FIG. 4a as having a shortened arm length, however, this length must be sufficiently long not to lose contact with bolt 28 in any position. Also, the drawings show only a schematic example, and are not necessarily perfect in their geometric proportions.)

By driving adjustment screw 30 that supports the transverse bolt 28, the bolt can be displaced in the projection 29 in a direction that is perpendicular to the bar direction. When looking at FIG. 4b, one realizes that downward adjustment of bolt 28 changes the contact point for the forward spring arm 27 in such a manner that at a maximum downward assembly deflection, There is obtained a clearly less degree of pinching of spring arms 26 and 27, than before downward adjustment of bolt 28. On the other hand, the adjustment of the bolt position does not make any difference in the situation prior to cushioning, i.e. in the situation shown in FIG. 4a. In FIG. 4a, bolt 28 will only slide along the forward spring arm 27 when the adjustment is made, without any influence on spring arm 27.

This means that the effective spring stiffness can be adjusted by using screw 30, and the same possibilities are achieved as in the first embodiment which employs a linearly active spring.

It seems clear that an option for biasing can also be provided, e.g. by making it possible to displace projection 29 along bar 16. Optionally, a similar biasing as in the first embodiment can be provided, by forcing the rear arm 26 inward in the assembly by means of a screw corresponding to the bias screw 3 in FIG. 1. Then, the spring arm 26 must of course engage an adapted support part on the end of such a screw.

It seems clear that the torsion spring can be placed in an appropriate manner around one of the bearing necks, and similarly, several torsion springs can be used together to provide a larger total springing force.

Alternatively, the springing mechanism may comprise a torsion spring arranged around one of the bearing necks so that the torsion spring has arms of which one engages one of the bars, and the other engages a shiftable projection on the seat attachment part for the post head.

Figure 6:
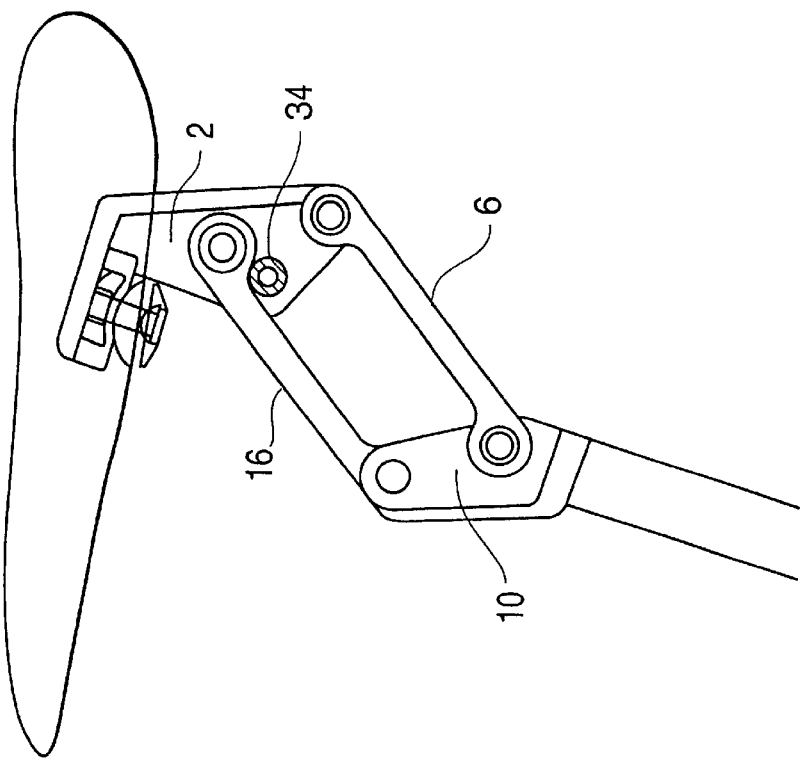
FIG. 6 shows in a simplified drawing a location of a separate stopper part for limiting upward deflection.

In other respects, a stopper part such as 34 in FIG. 6 may be provided to limit the swing of the assembly upwards, caused by the biasing.

Other types of engagement for the "adjustable arm" in the torsion spring are possible, so long as in the start state (i.e. prior to cushioning action) the adjustment detail for the contact point of the spring aim shall not influence the spring arm during adjustment, while the adjustment gives an effect for the spring deflection when the assembly is swung downwards.

One sees also that the embodiment including a torsion spring or torsion springs is suitable in combination with the asymmetric, "cupulate" embodiment of the post head 10 and seat attachment part 2, since the "cup edges" 12 and 13 provide an excellent basis for engagement of an arm torsion spring arranged about a bearing neck.

Figure 5:
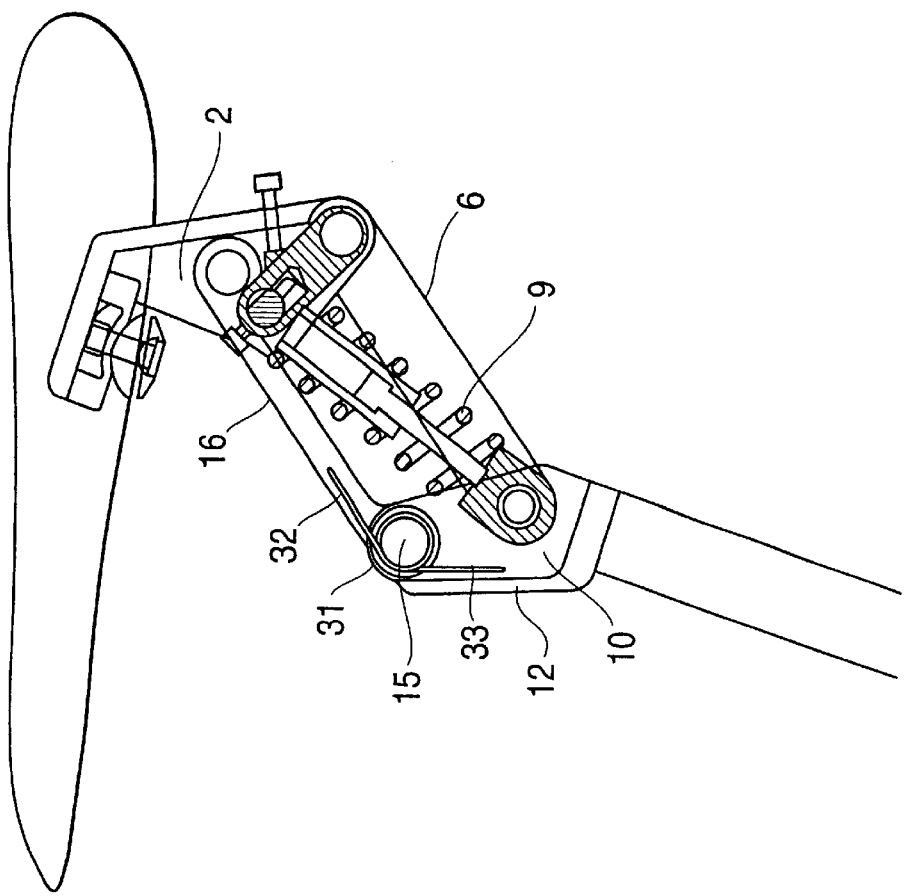
FIG. 5 shows an embodiment of a seat suspension assembly in accordance with the invention, with an extra torsion spring.

One also visualizes an option for supplementing a linear helical spring like in FIG. 1, by an additional torsion spring appropriately placed, e.g. around the bearing neck 15, in order to provide increased cushioning force. Such an embodiment appears from FIG. 5, where the extra torsion spring 31 arranged about bearing neck 15 has arms 32 and 33. Arm 32 contacts the inside/underside of the upper bar 16 (that may have the shape of a downward pointing U profile), and arm 33 contacts the inside of the "cup edge" 12, and gives a pressure in the outward opening direction. It will then probably be sufficient to provide adjustability for only the linear spring, but it is of course possible to have both springs adjustable in accordance with the important aspect of the present invention.

FIG. 6 shows, as previously mentioned, a simplified sketch where the important element is a stopper part 34 located in such a manner that the movement of the assembly in the upward direction is stopped in a position such as shown in FIG. 6. Such a stopper part 34, which is hidden on the inside of the cartridge unit 4 (see FIG. 1), preferably has an outer part of strong plastics to provide a soft end shock and to avoid metallic sound.

What is claimed is:

1. A seat suspension assembly for a vehicle, comprising:
   a seat attachment part having at least two first bearing portions;
   a seat post part including a seat post and a seat post head attached to a top of said seat post, with at least two second bearing portions provided on said seat post head;
   at least two generally parallel bars each having a first end and a second end, with the first end of one of said bars being journalled to one of said first bearing portions, the second end of said one bar being journalled to one of said second bearing portions, the first end of a second of said bars being journalled to another of said first bearing portions, and the second end of said second bar being journalled to another of said second bearing portions;

a spring mechanism arranged adjacent said at least two bars to provide an upwardly directed force against said seat attachment part such that said at least two bars extend obliquely from said at least two second bearing portions to said at least two first bearing portions; and a system to adjust the effective spring rate of said spring mechanism, wherein said spring mechanism includes a linearly acting spring having first and second ends with a spring acting line passing therethrough, and wherein said system is to adjust the effective spring rate of said spring mechanism by laterally shifting said first end of said spring relative to said spring acting line.

2. The seat suspension assembly according to claim 1, and further comprising a cartridge unit attached to said seat attachment part and extending between said at least two bars, wherein said first end of said spring includes an abutment housed within said cartridge unit, said second end of said spring is attached to said seat post head, and wherein said system is to laterally shift said first end of said spring relative to said spring acting line by translating said abutment within said cartridge unit generally transversely to said at least two bars.

3. The seat suspension assembly according to claim 2, wherein said at least two second bearing portions include an upper second bearing portion and a lower second bearing portion, and wherein said second end of said spring is attached to said seat post head by being attached to said lower second bearing portion.

4. The seat suspension assembly according to claim 3, wherein said at least two first bearing portions include an upper first bearing portion and a lower first bearing portion, and wherein said cartridge unit is attached to said seat attachment part by being attached to said lower first bearing portion.

5. The seat suspension assembly according to claim 4, and further comprising a biasing screw to pre-stress said spring, and a stopper part to limit travel of said at least two bars in an upward direction.

6. The seat suspension assembly according to claim 1, and further comprising a torsion spring having a hub and a first and a second arm extending from said hub, with said hub surrounding one of said bearing portions, said first arm engaging one of said at least two bars, and said second arm engaging one of said seat attachment part and said seat post part.

7. A seat suspension assembly for a vehicle, comprising:

a seat attachment part having at least two first bearing portions;

a seat post part having at least two second bearing portions, at least two generally parallel bars each having a first end and a second end, with the first end of one of said bars being journalled to one of said first bearing portions, the second end of said one bar being journalled to one of said second bearing portions, the first end of a second of said bars being journalled to another of said first bearing portions, and the second end of said second bar being journalled to another of said second bearing portions;

a torsion spring having a hub and a first and a second arm extending from said hub, with said hub surrounding one of said bearing portions, said first arm engaging one of said at least two bars, and said second arm engaging one of said seat attachment part and said seat post part;

a spring mechanism arranged adjacent said at least two bars to provide an upwardly directed force against said seat attachment part; and a system to adjust the effective spring rate of said spring mechanism.

8. A seat suspension assembly for a vehicle, comprising:

a cupulate seat attachment part having at least two first bearing portions projecting from an inner surface thereof;

a cupulate seat post part having at least two second bearing portions projecting from an inner surface thereof;

at least two substantially parallel bars each having a first end and a second end, with the first end of one of said bars being journalled to one of said first bearing portions, the second end of said one bar being journalled to one of said second bearing portions, the first end of a second of said bars being journalled to another of said first bearing portions, and the second end of said second bar being journalled to another of said second bearing portions; and a spring mechanism arranged adjacent said bars to provide an upwardly directed force against said seat attachment part.

9. The seat suspension assembly according to claim 8, wherein said seat post part includes a seat post and a cupulate seat post head attached to a top of said seat post, and wherein said at least two second bearing portions project from an inner surface of said cupulate seat post head.

10. The seat suspension assembly according to claim 9, wherein said spring mechanism is to provide an upwardly directed force against said seat attachment part such that said at least two bars extend obliquely from said at least two second bearing portions to said at least two first bearing portions.

11. The seat suspension assembly according to claim 10, wherein said first end and said second end of each of said bars includes an opening, wherein said bearing portions each include a member having a first end threaded into said cupulate seat attachment part and said cupulate seat post head, respectively, and also having a second end with a diameter greater than the diameter of said opening, and wherein said bars are journalled to said bearing portions, by receiving the members within the openings, respectively.

12. The seat suspension assembly according to claim 11, wherein said second end of said member includes a flange or a disc.

13. The seat suspension assembly according to claim 10, and further comprising a system to adjust the effective spring rate of said spring mechanism.

14. The seat suspension assembly according to claim 9, and further comprising a system to adjust the effective spring rate of said spring mechanism.

15. The seat suspension assembly according to claim 8, and further comprising a system to adjust the effective spring rate of said spring mechanism.

* * * * *